June 24, 1930.  J. O. WOODSOME  1,767,270
PRESSURE REGULATING VALVE
Filed March 12, 1928
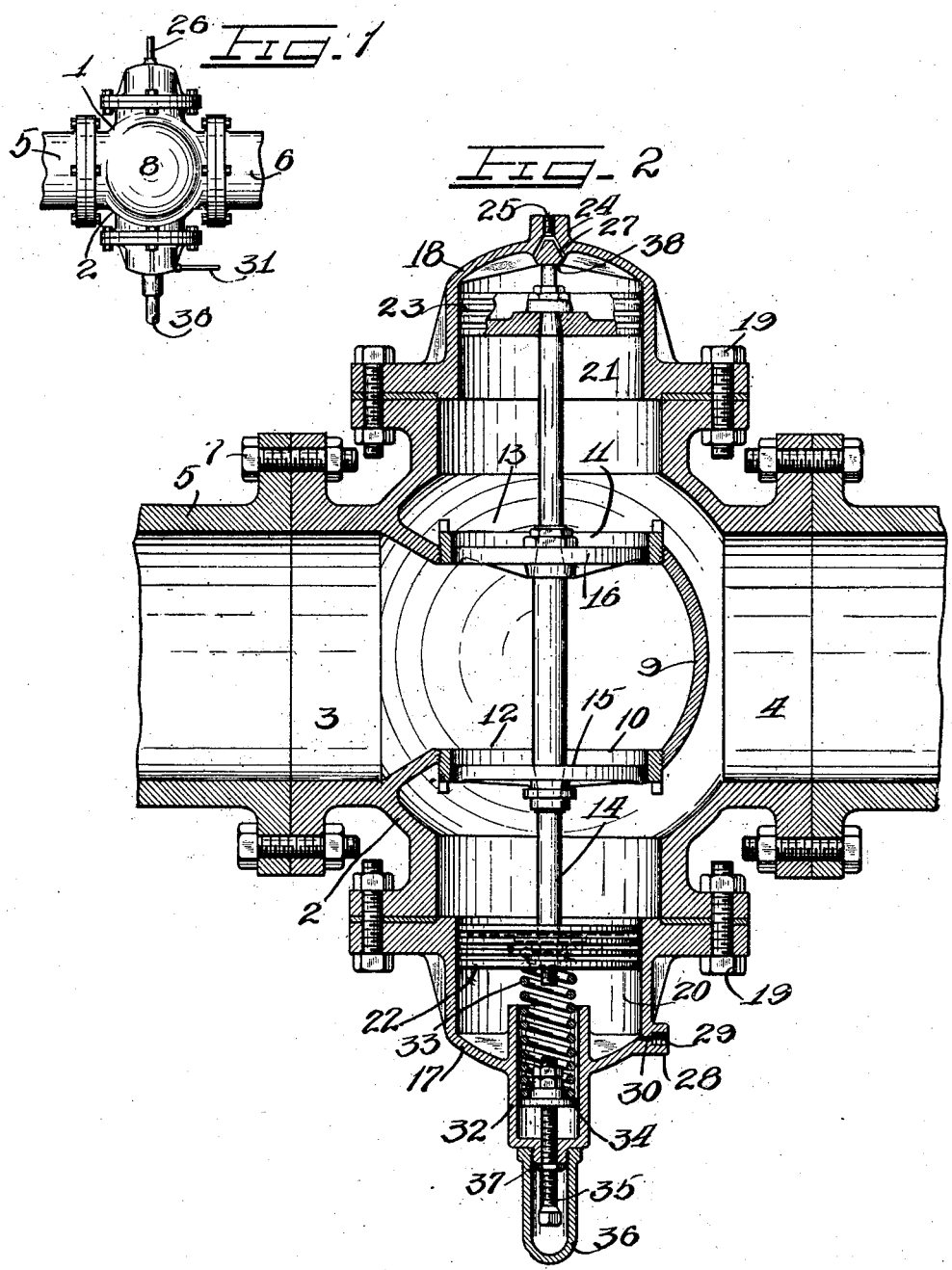
Inventor
John O. Woodsome
by Charles Allen
Attys.

Patented June 24, 1930

1,767,270

UNITED STATES PATENT OFFICE

JOHN O. WOODSOME, OF DETROIT, MICHIGAN

PRESSURE-REGULATING VALVE

Application filed March 12, 1928. Serial No. 261,040.

This invention relates to a pressure regulating valve and more particularly to a valve for controlling steam flow to paper machine driers and the like wherein means are provided for regulating the flow of steam in accordance with the actual pressure of the steam in the driers and the pressure desired.

In my co-pending application entitled "Valve controlling apparatus," Serial No. 116,306, I have disclosed a heating system for driers wherein pressure regulating valves of the type embodied in my present application are used to control the flow of steam to the driers.

It is accordingly an object of this invention to provide a steam regulating valve that will be automatically operated to maintain the desired pressure upon driers and the like in order to effect savings in the steam consumption.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view of a pressure regulating valve embodying the principles of my invention.

Figure 2 is an enlarged cross-sectional view of the same with parts in elevation.

The reference numeral 1 indicates as a whole the pressure regulating valve of my invention. Said valve 1 comprises an outer casing 2 provided with flanged intake and outlet ports 3 and 4 respectively, adapted to be connected to piping 5 and 6 by means of bolts 7 passing through the respective flanges on said pipes 5 and 6 and the casing 2. Said valve casing 2 is formed with a main spherical shaped body portion 8 upon the inner wall of which is integrally formed an internal wall 9. Said internal wall 9 is provided with spaced threaded openings for receiving rings 10 and 11 which form the internal ports 12 and 13 respectively. A valve stem 14, normally mounted in vertical position co-axially of the valve ports 12 and 13, carries a pair of spaced plungers 15 and 16 for closing said valve ports 12 and 13 respectively.

The respective ends of said valve stem 14 extend into chambered extensions 17 and 18 secured by means of bolts 19 to the lower and upper flanged portions of said valve casing 2. Each of said extensions 17 and 18 is cylindrically bored to form chambers or cylinders 20 and 21 respectively co-axial with the ports 12 and 13. Pistons 22 and 23 are mounted upon the respective ends of the valve stem 14 for reciprocating movement in said cylinders 20 and 21 respectively. As shown in Figure 2, the diameter of the pistons 22 and 23 is less than that of the plungers 15 and 16 so that the stem 14 and the plungers and pistons assembled thereon may be withdrawn from the casing as a unit.

The upper chambered extension 18 is provided with a boss 24 having a threaded bore 25 for receiving a relatively small pipe 26. Branched passages 27 form a communication between the threaded bore 25 and the interior of the chamber 21 above the piston 23.

The lower chambered extension 17 is provided in a somewhat similar manner with a boss 28 having a threaded bore 29 communicating by means of a passage 30 with the interior of the chamber 20 below the piston 22. A pipe 31 is adapted to be threaded into the bore 29. Said extension 17 is also provided with a sleeve 32 co-axial with the valve stem 14 and adapted to house a coiled spring 33. Said spring 33 is held under compression between the bottom face of the piston 22 and an adjustable head 34 secured to the inner end of a bolt 35 extending through the lower closed end of the sleeve 32. A cap 36 adapted to be threaded upon the lower end of said sleeve 32 encloses said bolt 35, and may be removed for the purpose of making adjustments. A nut 37 upon the bolt 35 serves to prevent the bolt 35 from turning out of adjustment.

As described in my co-pending application, Serial No. 116,306, a pressure regulating valve of this type may be suitably used in connection with the control of steam to paper machine driers. In this connection, a source of fluid, such as air, under the pressure desired to be maintained in the driers is conducted through the pipe 26 into the upper chamber 21 above the piston 23. A pipe 31 serves to equalize the pressure within the chamber 20 below the piston 22 with that actually existing in the steam header leading to the driers. Accordingly, if the compression of the spring 33 is such as to just balance the weight of the valve stem 14, and attached pistons and plungers, the differential pressure between the air pressure above the piston 23 and the steam pressure below the piston 22 will be effective in controlling movement of the valve stem 14 and plungers 15 and 16 to open or close the ports 12 and 13. For instance, if the steam pressure in the chamber 20 falls below the air pressure within the chamber 21, the valve stem and plungers 15 and 16 will move downwardly, thereby opening the valve ports 12 and 13 to allow live steam to pass through the pipe 6 leading to the steam header. On the other hand, if the pressure of the steam in the chamber 20 is greater than the air pressure within the chamber 21, the valve stem remains in its upper position with the top end of the valve stem abutting the bottom of the boss 24 as at 38. In this position, as illustrated in Figure 2, the valve ports 12 and 13 are both closed by the plungers 15 and 16 respectively.

While my pressure regulating valve has been described in connection with its use in controlling steam to paper machine driers, it will be understood that it is generally applicable for a variety of similar uses, wherever the control of the flow of a fluid becomes important.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

A balanced pressure regulating valve comprising a casing having alined main inlet and outlet ports and having an integral internal substantially globular shell doubly ported in a direction normal to the said main inlet and outlet ports and presenting a barrier to fluid flow in a line parallel to the fluid flow in the said main inlet and outlet ports, the said casing having a pair of auxiliary ports in alinement with the ports in the internal shell, cylinders, closed at one end, removably mounted on the casing in alinement with the said auxiliary ports, a stem extending through the internal shell and into the said cylinders, spaced plungers on the stem arranged to simultaneously close the ports in the inner shell, pistons on the stem slidable in the cylinders and normally in communication with the fluid space of the casing, the said pistons each having a diameter less than that of the said plungers, spring means arranged to balance the weight of the said stem and the plungers and pistons thereon, and means arranged to admit fluid to the pistons on the side opposite that in communication with the main outlet port.

In testimony whereof I have hereunto subscribed my name at Detroit, Wayne County, Michigan.

JOHN O. WOODSOME.